United States Patent
Jin et al.

(10) Patent No.: US 9,185,226 B2
(45) Date of Patent: Nov. 10, 2015

(54) VOICEMAIL SERVER MONITORING/REPORTING VIA AGGREGATED DATA

(75) Inventors: Zhiying Jin, Lexington, MA (US); Wei Xia, Sudbury, MA (US); Gerald Honma, Aiea, HI (US); Jo Ann Kagawa, Honolulu, HI (US); Jianxiu Hao, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1397 days.

(21) Appl. No.: 12/540,859

(22) Filed: Aug. 13, 2009

(65) Prior Publication Data

US 2011/0038467 A1    Feb. 17, 2011

(51) Int. Cl.
*G06F 7/00* (2006.01)
*H04M 3/533* (2006.01)
*H04M 3/36* (2006.01)

(52) U.S. Cl.
CPC ............... *H04M 3/533* (2013.01); *H04M 3/36* (2013.01); *H04M 2201/38* (2013.01); *H04M 2203/253* (2013.01)

(58) Field of Classification Search
CPC .... G06Q 30/04; H04L 67/306; H04L 67/125; H04M 15/00; H04M 2215/0164; G10L 15/18; G10L 15/26; G06F 17/30227
USPC ........... 707/603, 648; 379/9.04, 88.13, 88.16, 379/88.18, 221.03, 226.06; 455/412.1, 455/412.2, 413
See application file for complete search history.

(56) References Cited

U.S. PATENT DOCUMENTS

| | | | |
|---|---|---|---|
| 7,403,487 B1* | 7/2008 | Foladare et al. | 370/252 |
| 8,467,354 B1* | 6/2013 | Jerkunica et al. | 370/338 |
| 8,630,190 B2* | 1/2014 | Goyal et al. | 370/252 |
| 2002/0069037 A1* | 6/2002 | Hendrickson et al. | 702/186 |
| 2002/0126822 A1* | 9/2002 | Boehmke et al. | 379/221.03 |
| 2003/0112930 A1* | 6/2003 | Bosik et al. | 379/88.17 |
| 2004/0024861 A1* | 2/2004 | Coughlin | 709/224 |
| 2005/0276394 A1* | 12/2005 | Rossi et al. | 379/88.17 |
| 2007/0127637 A1* | 6/2007 | Bettis et al. | 379/67.1 |
| 2007/0206563 A1* | 9/2007 | Silver et al. | 370/351 |
| 2008/0095339 A1* | 4/2008 | Elliott et al. | 379/93.01 |
| 2008/0167014 A1* | 7/2008 | Novick et al. | 455/413 |
| 2009/0222457 A1* | 9/2009 | Gallant | 707/10 |
| 2009/0234845 A1* | 9/2009 | Desantis et al. | 707/5 |
| 2009/0271515 A1* | 10/2009 | Iyengar et al. | 709/226 |
| 2009/0287433 A1* | 11/2009 | Houston et al. | 702/62 |
| 2009/0287846 A1* | 11/2009 | Iyengar et al. | 709/242 |
| 2010/0015926 A1* | 1/2010 | Luff | 455/67.13 |
| 2010/0020947 A1* | 1/2010 | Van Gundy et al. | 379/88.17 |
| 2010/0046731 A1* | 2/2010 | Gisby et al. | 379/211.01 |
| 2010/0058408 A1* | 3/2010 | LaFreniere et al. | 725/106 |
| 2010/0158211 A1* | 6/2010 | Chatterjee et al. | 379/88.12 |

\* cited by examiner

*Primary Examiner* — Mariela Reyes
*Assistant Examiner* — Linh Black

(57) ABSTRACT

A device receives, from a voicemail server, log information associated with voicemail transactions performed by the voicemail server, and determines data elements, of the log information, to be aggregated. The device also aggregates the determined data elements of the log information, determines a time period to provide the aggregated log information to a database for storage, and provides the aggregated log information to the database at the determined time period.

25 Claims, 10 Drawing Sheets

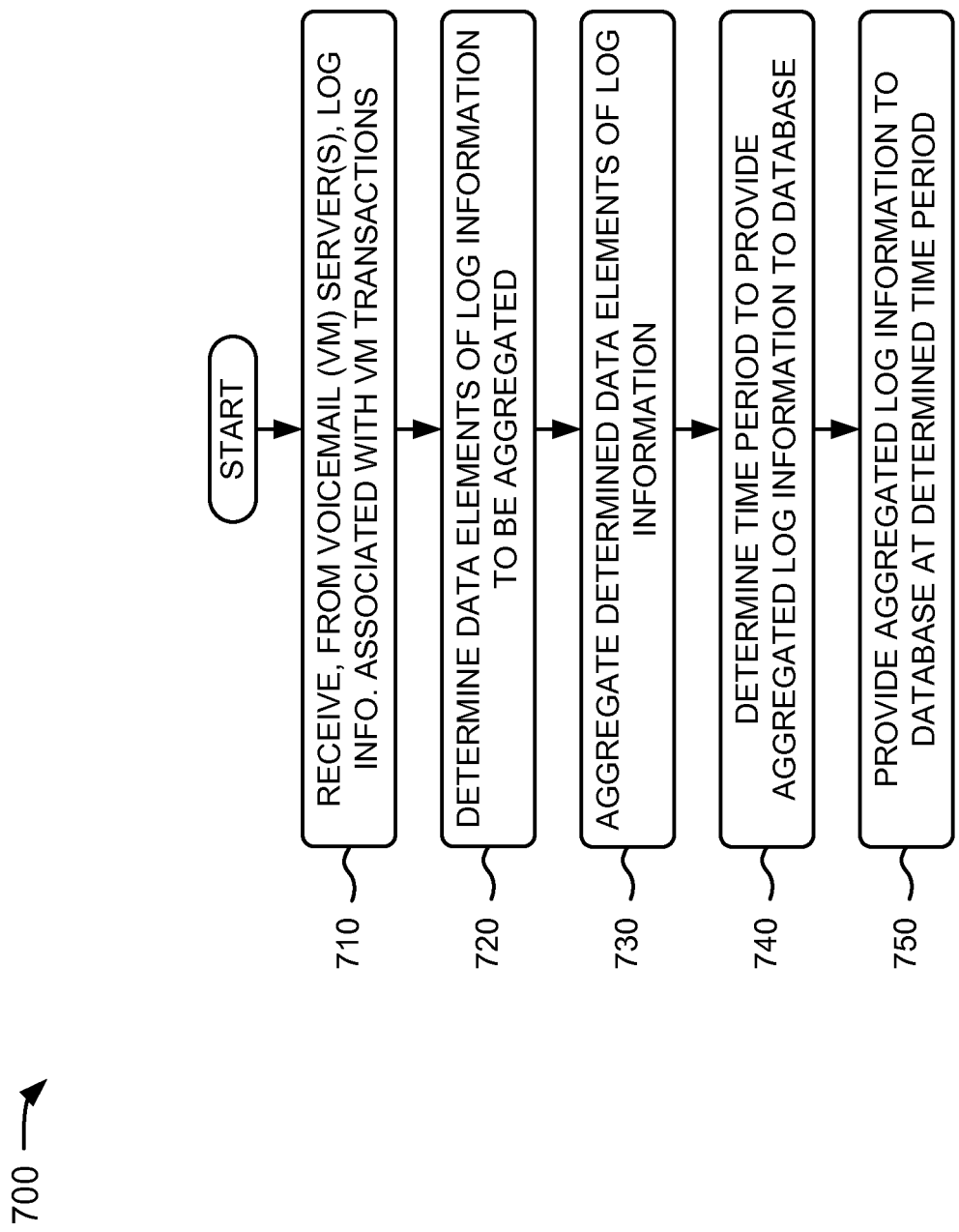

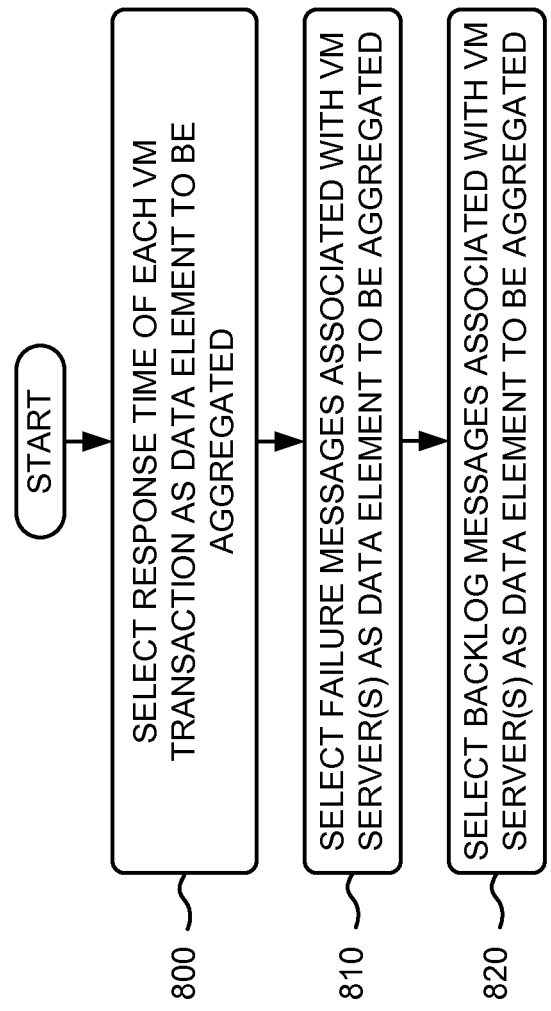

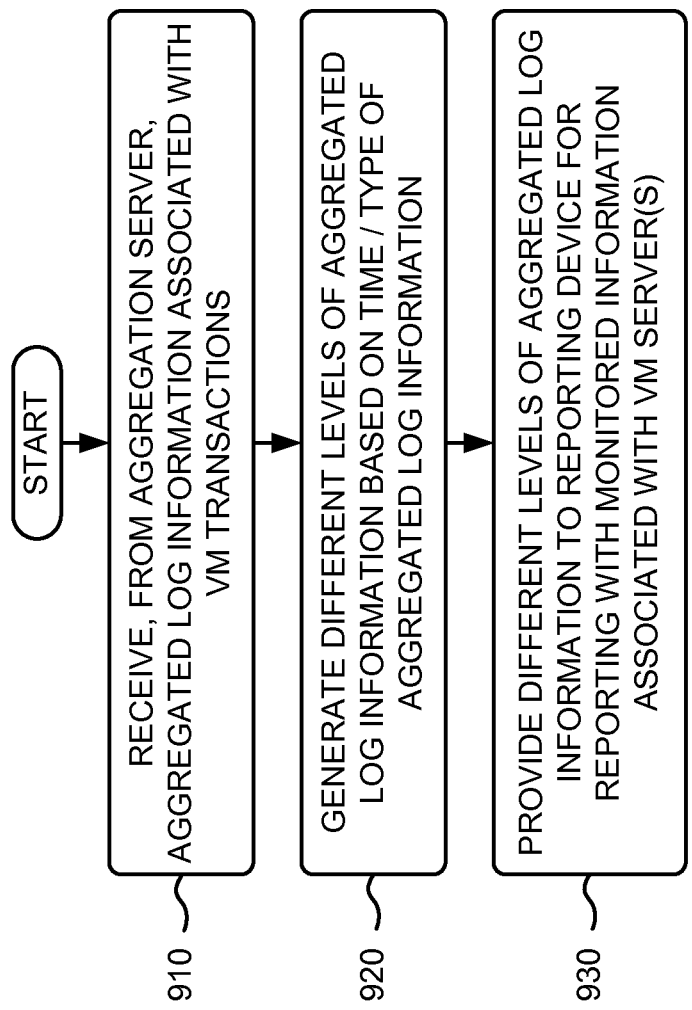

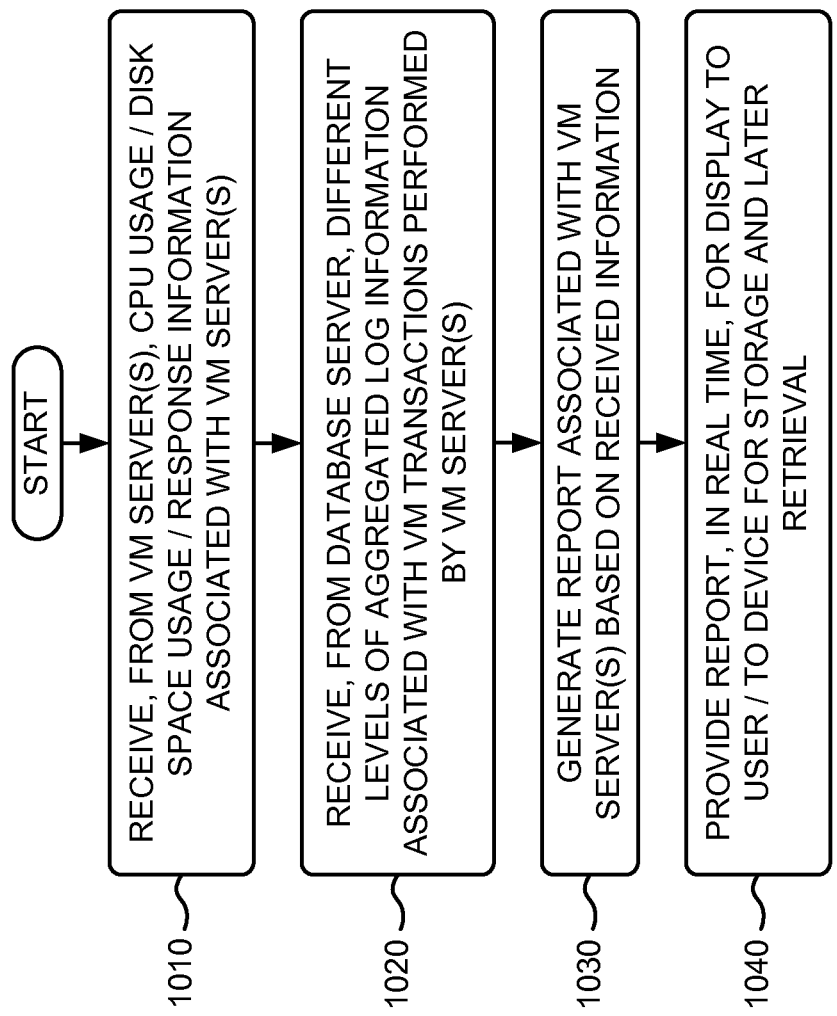

VOICEMAIL SERVER MONITORING/REPORTING VIA AGGREGATED DATA

BACKGROUND

Visual voicemail (VVM) is a user friendly application that adds a visual aspect to managing voicemail messages. Traditional telephone user interface (TUI) voicemail requires users to dial into a system to listen to voicemails in a sequential order. VVM may enable mobile phone users to manage voicemail message in an order of their choice, e.g., in a random order rather than a sequential order.

VVM servers (and some voicemail (VM) servers) provide a middle interface between mobile devices and a voicemail system. All transactions between the mobile devices and the voicemail system may be provided through the VVM servers, and a large amount of transactions may place a heavy load on the VVM servers. The VVM servers may be monitored to determine and/or report load conditions experienced by the VVM servers in real time. For example, processor (e.g., central processing unit (CPU)) usage information, memory (e.g., disk space) usage information, and/or response information associated with the VVM servers may be monitored. Log files associated with the VVM servers may also be scanned (e.g., in real time) to monitor a response time of each VM transaction, failure messages associated with the VVM servers, and/or backlog messages associated with the VVM servers. The monitored information may be utilized to provide one or more reports about the load conditions experienced by the VVM servers. However, real time scans of the log files associated with the VVM servers have a significant impact on the performance of the VVM servers. Furthermore, multiple VVM servers in a cluster render data combination and real time scans of the log files associated with the VVM servers extremely difficult.

BRIEF DESCRIPTION OF THE DRAWINGS

FIGS. 7 and 8 depict flow charts of an exemplary process for aggregating log information associated with VM transactions according to implementations described herein;

FIG. 9 illustrates a flow chart of an exemplary process for providing different levels of aggregated log information to the reporting device according to implementations described herein; and FIG. 10 depicts a flow chart of an exemplary process for generating reports associated with VM server(s) according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that may aggregate log information associated with voicemail (VM) servers, and may provide different levels (e.g., based on time periods or intervals) of aggregated data for reporting purposes. In one implementation, for example, the systems and/or methods may receive, from one or more voicemail servers, log information associated with voicemail transactions. The systems and/or methods may determine data elements of the log information to be aggregated, and may aggregate the determined data elements of the log information. The systems and/or methods may determine a time period to provide the aggregated log information to a database, and may provide the aggregated log information to the database at the determined time period.

As used herein, the term "user" is intended to be broadly interpreted to include a user device and/or a reporting device or a user of a user device and/or a reporting device.

Figure 1:
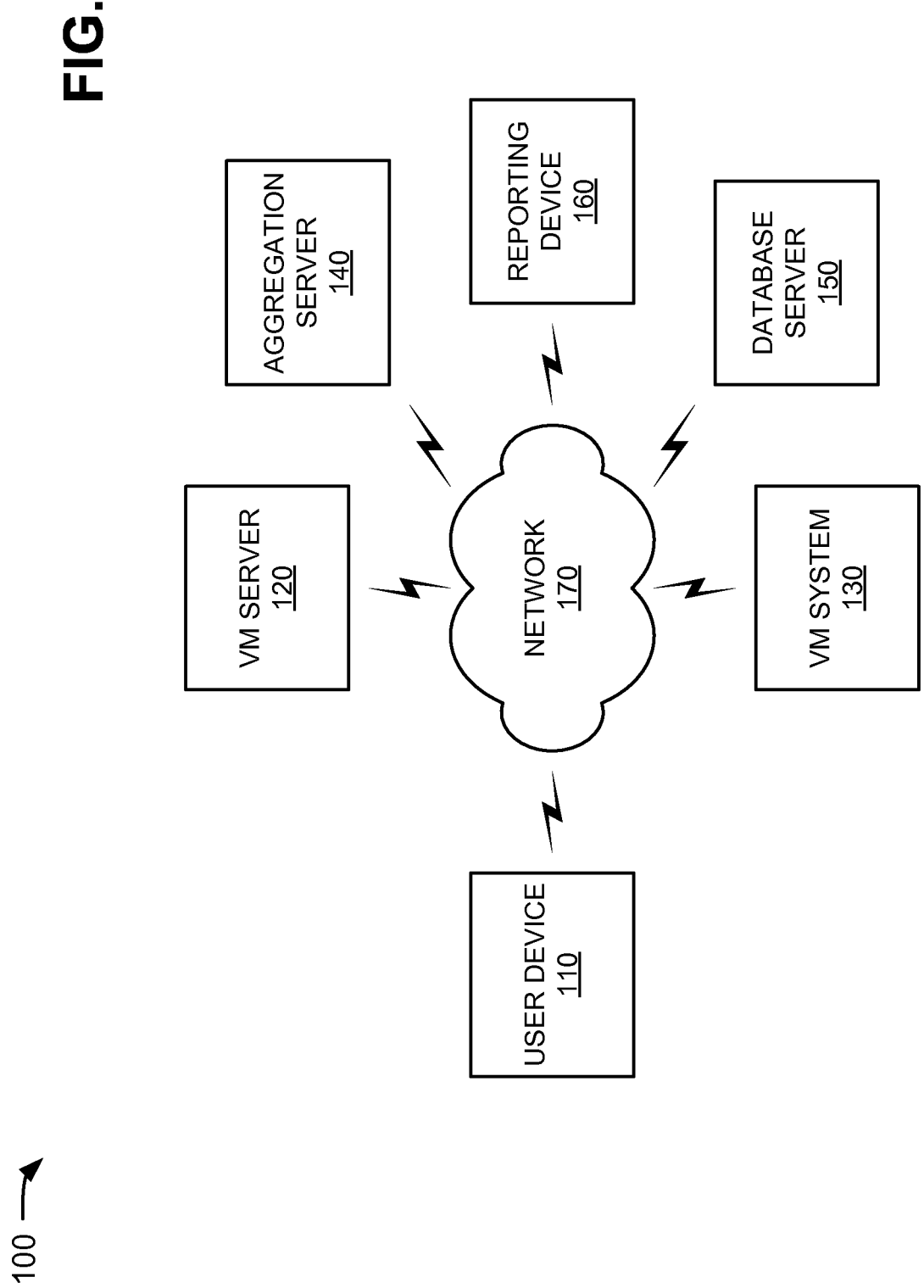
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a user device 110, a voicemail (VM) server 120, a VM system 130, an aggregation server 140, a database server 150, and a reporting device 160 interconnected by a network 170. Components of network 100 may interconnect via wired and/or wireless connections. A single user device 110, VM server 120, VM system 130, aggregation server 140, database server 150, reporting device 160, and network 170 have been illustrated in FIG. 1 for simplicity. In practice, there may be more user devices 110, VM servers 120, VM systems 130, aggregation servers 140, database servers 150, reporting devices 160, and/or networks 170. Also, in some instances, one or more of the components of network 100 may perform one or more functions described as being performed by another one or more of the components of network 100.

User device 110 may include any device that is capable of accessing VM server 120 and/or VM system 130 via network 170. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a personal gaming system, or other types of computation or communication devices. User device 110 may enable a user to provision and utilize a voicemail application or a VVM application (e.g., provided by VM server 120), and may receive notifications when a new voicemail arrives. For example, if user device 110 is web-based device, user device 110 (e.g., via a web browser) may permit a user to view, listen to, and/or manage voicemails through a hypertext transfer protocol over secure socket layer (HTTPS) on the Internet. If user device 110 is a cell phone, user device 110 may implement a Java-based VVM application that may permit a user to view, listen to, and/or manage voicemails.

VM server 120 may include one or more server entities, or other types of computation or communication devices, that gather, process, search, and/or provide information in a manner described herein. VM server 120 may provide a voicemail application or a VVM application to user device 110, may interface with, either directly or via a device proxy server (not shown), user device 110, and may interface with other backend devices (e.g., aggregation server 140, database server 150, and/or reporting device 160). VM server 120 may convert requests from user device 110 into a format that the backend devices may understand, and may aggregate different voicemail systems, such as home, office, and wireless voicemail systems, associated with a user of user device 110. VM server 120 may provide a middle interface between user device 110 and VM system 130. All voicemail transactions between user device 110 and VM system 130 may be provided through VM server 120, and a large amount of transactions may place a heavy load on VM server 120.

In one example, VM server 120 may provide, to aggregation server 140, log information associated with VM server 120. The log information may include information associated with voicemail transactions (e.g., voicemail messages, a number of voicemails, a number of unheard voicemails, a list of voicemail identifiers (IDs), etc.), a response time for each voicemail transaction, failure messages (e.g., failure by VM server 120), backlog messages (e.g., backlog associated with VM server 120), etc. Aggregation server 140 may aggregate the log information, and may provide the aggregated log information to reporting device 160, via database server 150.

In another example, VM server 120 may provide, to reporting device 160, monitored information associated with VM server 120. The monitored information may include processor (e.g., CPU) usage information, memory (e.g., disk space) usage information, and/or response information associated with VM server 120. Reporting device 160 may utilize the aggregated log information and the monitored information to generate real time report information associated with VM server 120. The real time report information may include one or more reports about load conditions experienced by VM server 120.

VM system 130 may include one or more server entities, or other types of computation or communication devices, that gather, process, search, and/or provide information in a manner described herein. VM system 130 may provide voice mailboxes for home, office, or wireless devices (e.g., user device 110), and may provide a service-wide directory for voice mailbox location lookup. The service-wide directory may provide telephone numbers, locations of voice mailboxes, and/or other information associated with home, office, or wireless devices. In one exemplary implementation, VM server 120 may aggregate one or more voice mailboxes (e.g., provided by VM system 130) associated with a user of user device 110. VM system 130 may provide voicemail messages from the one or more voice mailboxes to VM server 120 for display to user device 110 via the VVM application.

Aggregation server 140 may include one or more server entities, or other types of computation or communication devices, that gather, process, search, and/or provide information in a manner described herein. In one example, aggregation server 140 may receive, from VM server 120, log information (e.g., voicemail messages, a number of voicemails, a number of unheard voicemails, a list of voicemail IDs, a response time for each voicemail transaction, failure messages, backlog messages, etc.) associated with VM server 120. Aggregation server 140 may aggregate the log information, and may provide the aggregated log information to database server 150. Further details of aggregation server 140 are provided below in connection with, for example, FIG. 4.

Database server 150 may include one or more server entities, or other types of computation or communication devices, that gather, process, search, and/or provide information in a manner described herein. Database server 150 may include one or more storage devices that may store the aggregated log information provided by aggregation server 140. In one implementation, database server 150 may generate different levels of aggregated log information based on time (e.g., one hour log information, daily log information, etc.) and/or type (e.g., log information associated with backlog, failures, etc.), and may provide the different levels of aggregated log information to reporting device 160. In another example, reporting device 160 may retrieve selected aggregated log information from database server 150. Although FIG. 1 shows database server 150 as separate from aggregation server 140, in other implementations, database server 150 may be incorporated in aggregation server 140. Further details of database server 150 are provided below in connection with, for example, FIG. 5.

Reporting device 160 may include a personal computer, a laptop computer, a netbook computer, or other types of computation or communication devices, that gather, process, search, and/or provide information in a manner described herein. In one exemplary implementation, reporting device 160 may receive the monitored information (e.g., processor usage information, memory usage information, and/or response information) from VM server 120, and may receive the different levels of aggregated log information from database server 150. Alternatively and/or additionally, reporting device 160 may retrieve selected aggregated log information from database server 150. Reporting device 160 may generate a report associated with VM server 120 based on the received information, and may provide the report (e.g., in real time) for display to a user (or to another device for storage and later retrieval). Although FIG. 1 shows reporting device 160 as separate from aggregation server 140 and database server 150, in other implementations, aggregation server 140, database server 150, and reporting device 160 may be incorporated as a single device. Further details of reporting device 160 are provided below in connection with, for example, FIG. 6.

Network 170 may include one or more networks of any type. For example, network 170 may include a local area network (LAN), a wide area network (WAN), a metropolitan area network (MAN), a telephone network, such as the Public Switched Telephone Network (PSTN) or Public Land Mobile Network (PLMN), an intranet, the Internet, an optical fiber (or fiber optic)-based network, or a combination of networks.

Although not shown in FIG. 1, network 100 may include a variety of other components, such as a device proxy server, a transcoding server, an authentication server, a gateway server, etc. The device proxy server may connect to user device 110; may route requests from user device 110 to VM server 120, the authentication server, the transcoding server, etc.; and may convert content (e.g., voicemail lists, voicemail audio files, etc.) into a format that may be received by user device 110. The transcoding server may transcode an audio file into a format (e.g., MP3 format, QCP format, etc.) that may be played by user device 110. The authentication server may authenticate (e.g., via a login and/or password) a user associated with user device 110 if user device 110 attempts to access the device proxy server or VM server 120. The authentication server may store user credentials and/or may retrieve user credentials from VM server 120. If the user is authenticated, the authentication server may issue a temporary session data certificate (e.g., a cookie) to user device 110 that may be used for further data calls between user device 110 and VM server 120.

Figure 2:
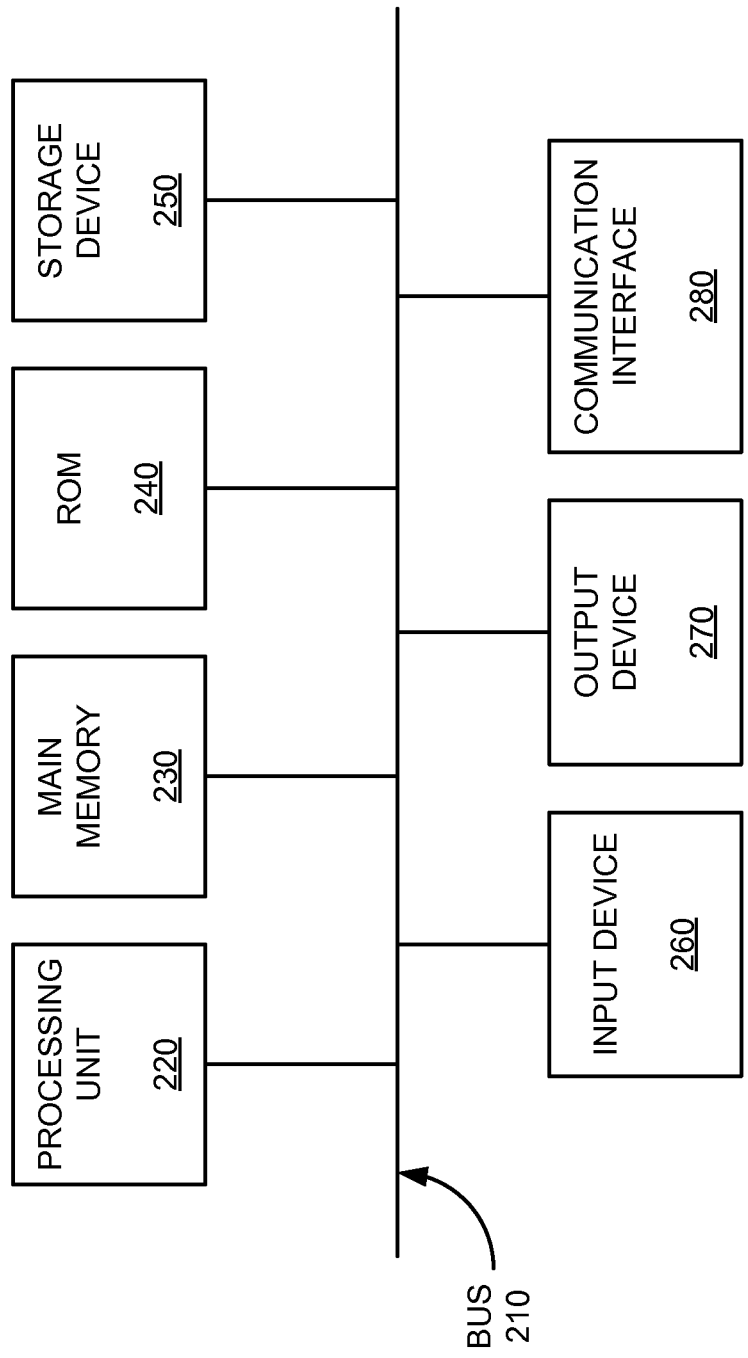
FIG. 2 illustrates a diagram of exemplary components of a user device, a voicemail (VM) server, a VM system, an aggregation server, a database server, and/or a reporting device of the network depicted in FIG. 1.

FIG. 2 is an exemplary diagram of a device 200 that may correspond to user device 110, VM server 120, VM system 130, aggregation server 140, database server 150, and/or reporting device 160. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include one or more random access memories (RAMs) or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 170.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
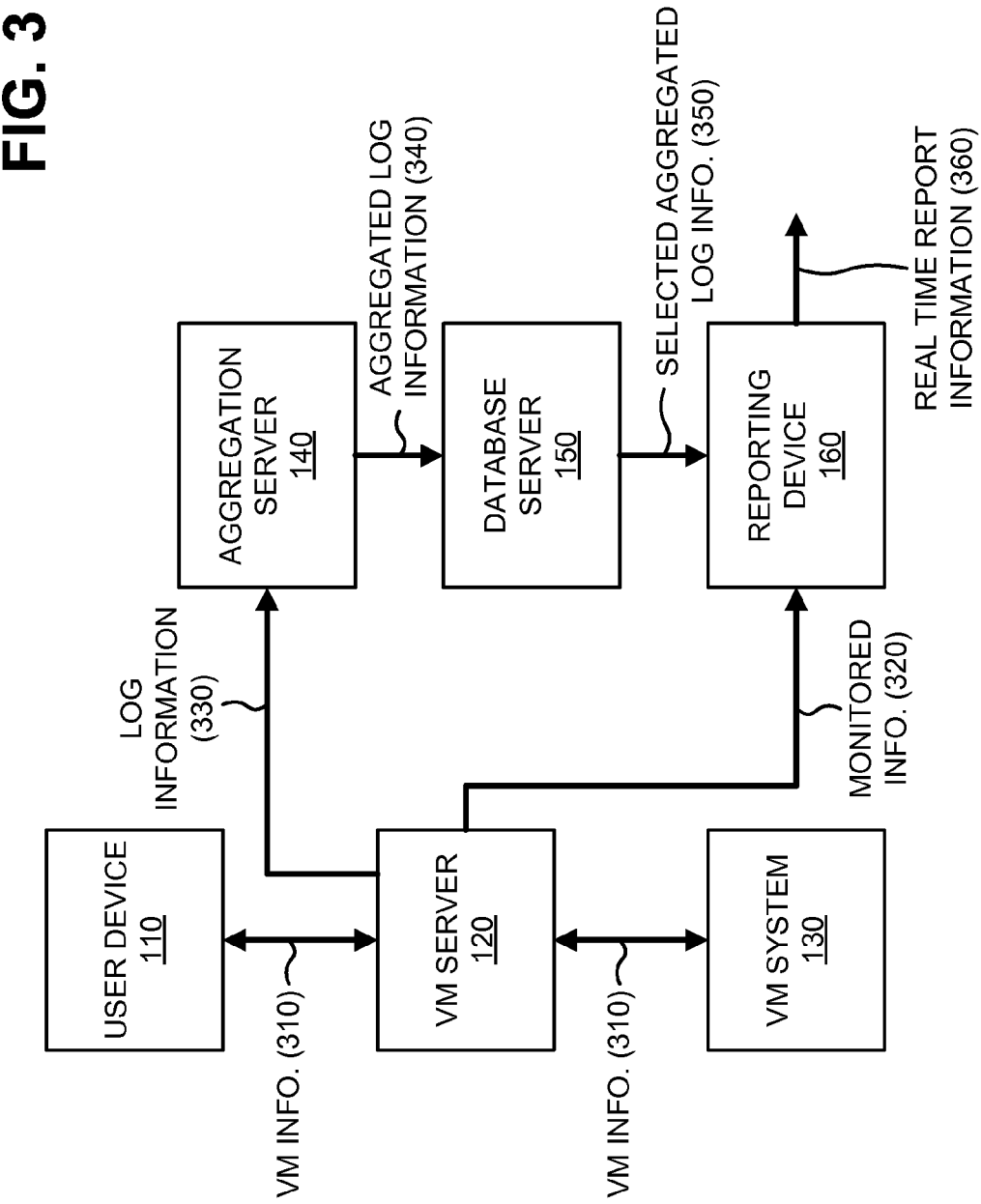
FIG. 3 depicts a diagram of exemplary interactions among components of an exemplary portion of the network illustrated in FIG. 1.

FIG. 3 depicts a diagram of exemplary interactions among components of an exemplary portion 300 of network 100. As illustrated, exemplary network portion 300 may include user device 110, VM server 120, VM system 130, aggregation server 140, database server 150, and reporting device 160. User device 110, VM server 120, VM system 130, aggregation server 140, database server 150, and reporting device 160 may include the features described above in connection with, for example, FIG. 1.

As further shown in FIG. 3, user device 110, VM server 120, and VM system 130 may exchange VM information 310 between each other. VM information 310 may include any information associated with providing voicemail services to user device 110. For example, VM information 310 may include voicemail transactions, such as voicemail messages, a number of voicemails, a number of unheard voicemails, a list of voicemail IDs, voicemail notifications, voicemail applications, VVM applications, billing information, etc.

The voicemail transactions may place load conditions on VM server 120, and VM server 120 may generate information associated with the load conditions. For example, as further shown in FIG. 3, VM server 120 may generate monitored information 320 and log information 330. Monitored information 320 may include processor (e.g., CPU) usage information, memory (e.g., disk space) usage information, and/or response information associated with VM server 120. Log information 330 may include information (e.g., obtained from log files produced by VM server 120) associated with voicemail transactions (e.g., voicemail messages, a number of voicemails, a number of unheard voicemails, a list of voicemail identifiers (IDs), etc.), a response time for each voicemail transaction, failure messages (e.g., failure by VM server 120), backlog messages (e.g., backlog associated with VM server 120), etc. VM server 120 may provide monitored information 320 directly to reporting device 160. Log information 330 may be directly written to aggregation server 140, rather than obtained via a real-time scan of log files.

Aggregation server 140 may receive log information 330 from VM server 120, and may aggregate log information 330. Aggregation server 140 may filter log information 330 by aggregating particular data elements (e.g., as defined by a user of reporting device 160) of log information 330 to produce aggregated log information 340. The particular data elements to aggregate may be changed (e.g., data elements may be added or subtracted) by the user of reporting device 160, which may provide flexibility without modifying VM server 120. As further shown in FIG. 3, aggregation server 140 may provide aggregated log information 340 to database server 150. In one exemplary implementation, aggregation server 140 may provide aggregated log information 340 to database server 150 at predetermined time intervals (e.g., every five minutes) in order to minimize load on database server 150.

Database server 150 may receive aggregated log information 340 from aggregation server 140, and may store aggregated log information 340. In one exemplary implementation, database server 150 may generate different levels of aggregated log information 340 based on time (e.g., one hour log information, daily log information, etc.) and/or type (e.g., log information associated with backlog, failures, etc.), and may provide the different levels of aggregated log information 340 to reporting device 160. In another example, reporting device 160 may retrieve selected aggregated log information 350 from database server 150. Selected aggregated log information 350 may include one or more of the different levels of aggregated log information 340 that may be selected by a user of reporting device 160.

Reporting device 160 may receive monitored information 320 from VM server 120, and may receive the different levels of aggregated log information 340 from database server 150. Alternatively and/or additionally, reporting device 160 may retrieve selected aggregated log information 350 from database server 150. Reporting device 160 may generate real time report information 360 based on the received information (e.g., based on monitored information 320, the different levels of aggregated log information 340, and/or selected aggregated log information 350). Real time report information 360 may include one or more reports associated with operation of VM server 120. Reporting device 160 may provide the one or more reports (e.g., in real time) for display to a user (e.g., a network operator, network manager, network administrator, etc.) of reporting device 160, and/or may provide the one or more reports to another device for storage and later retrieval. Alternatively and/or additionally, reporting device 160 may store real time report information 360 for later retrieval by the user of reporting device 160.

Although FIG. 3 shows exemplary components of network portion 300, in other implementations, network portion 300 may contain fewer, different, differently arranged, or additional components than depicted in FIG. 3. In still other implementations, one or more components of network portion 300 may perform one or more other tasks described as being performed by one or more other components of network portion 300.

Figure 4:
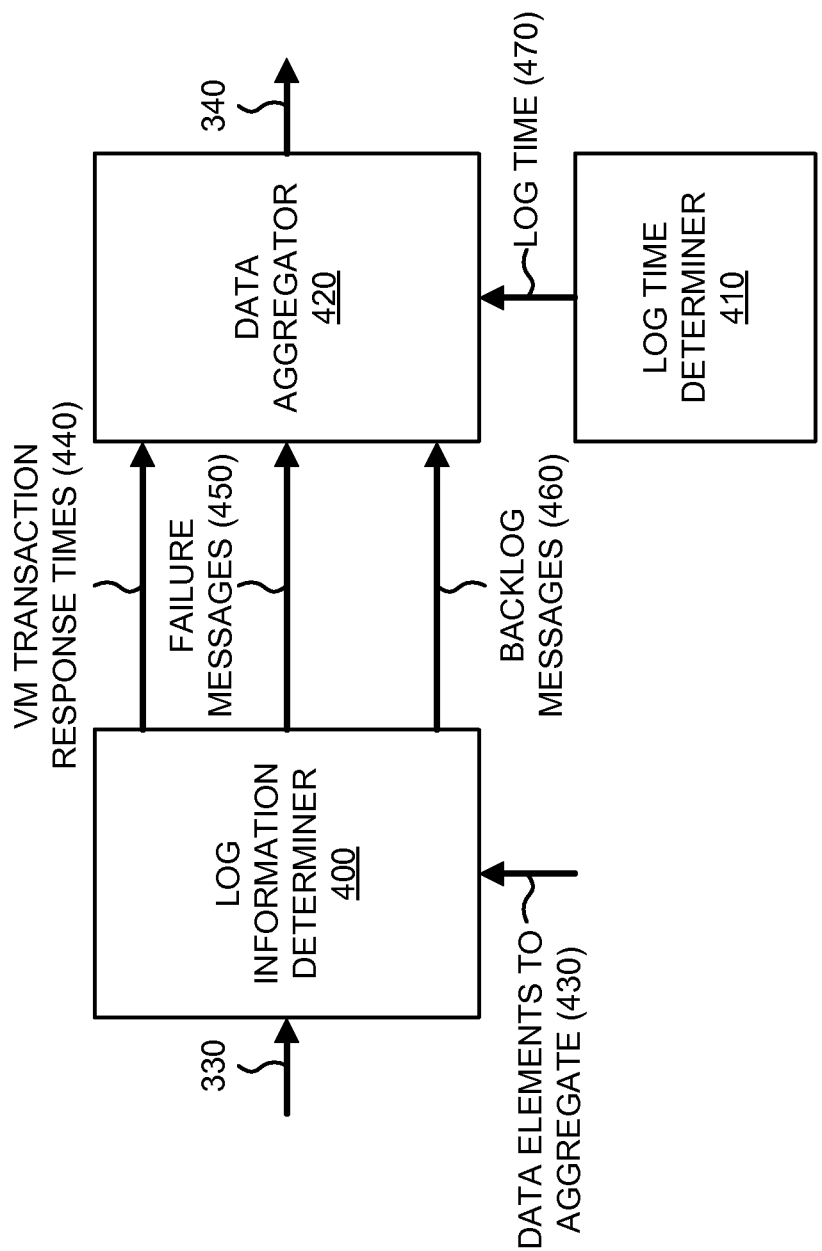
FIG. 4 illustrates a diagram of exemplary functional components of the aggregation server depicted in FIG. 1.

FIG. 4 illustrates a diagram of exemplary functional components of aggregation server 140. In one implementation, the functions described in connection with FIG. 4 may be performed by one or more components of device 200 (FIG. 2). As shown in FIG. 4, aggregation server 140 may include a log information determiner 400, a log time determiner 410, and a data aggregator 420.

Log information determiner 400 may include hardware or a combination of hardware and software that may receive log information 330 from VM server 120, and may receive (e.g., from reporting device 160) data elements to aggregate 430. Data elements to aggregate 430 may define particular data elements (e.g., of log information 330) to be aggregated. The particular data elements to aggregate may be changed (e.g., data elements may be added or subtracted) by the user of reporting device 160, which may provide flexibility without modifying VM server 120. For example, log information determiner 400 may select (e.g., from log information 330 and based on data elements to aggregate 430) VM transaction response times 440, failure messages 450 associated with VM server 120, and/or backlog messages 460 associated with VM server 120 as information to be aggregated. VM transaction response times 440 may include response times for voicemail transactions (e.g., voicemail messages, a number of voicemails, a number of unheard voicemails, a list of IDs, etc.). Failure messages 450 may include messages indicating a failure by VM server 120. Backlog messages 460 may include messages indicating a backlog associated with VM server 120. Log information determiner 400 may provide VM transaction response times 440, failure messages 450, and backlog messages 460 to data aggregator 420. In other implementations, log information determiner 400 may select other data elements of log information 330 (e.g., other information associated with performance of VM server 120).

Log time determiner 410 may include hardware or a combination of hardware and software that may provide a log time 470 to data aggregator 420. Log time 470 may include a predetermined time interval when aggregation server 140 may provide aggregated log information 340 to database server 150 (e.g., which may minimize load on database server 150). In one example, log time 470 may include a predetermined time interval (e.g., every five minutes, every ten minutes, etc.). Log time 470 may be determined (and/or modified) by aggregation server 140 or may be provided to aggregation server 140 by reporting device 160. Log time 470 may also be changed by a user of reporting device 160.

Data aggregator 420 may include hardware or a combination of hardware and software that may receive VM transaction response times 440, failure messages 450, and backlog messages 460 from log information determiner 400, and may receive log time 470 from log time determiner 410. Data aggregator 420 may aggregate VM transaction response times 440, failure messages 450, and backlog messages 460 to produce aggregated log information 340. Data aggregator 420 may provide aggregated log information 340 to database server 150 at the predetermined time interval provided by log time 470.

Although FIG. 4 shows exemplary functional components of aggregation server 140, in other implementations, aggregation server 140 may contain fewer, different, differently arranged, or additional functional components than depicted in FIG. 4. In still other implementations, one or more functional components of aggregation server 140 may perform one or more other tasks described as being performed by one or more other functional components of aggregation server 140.

Figure 5:
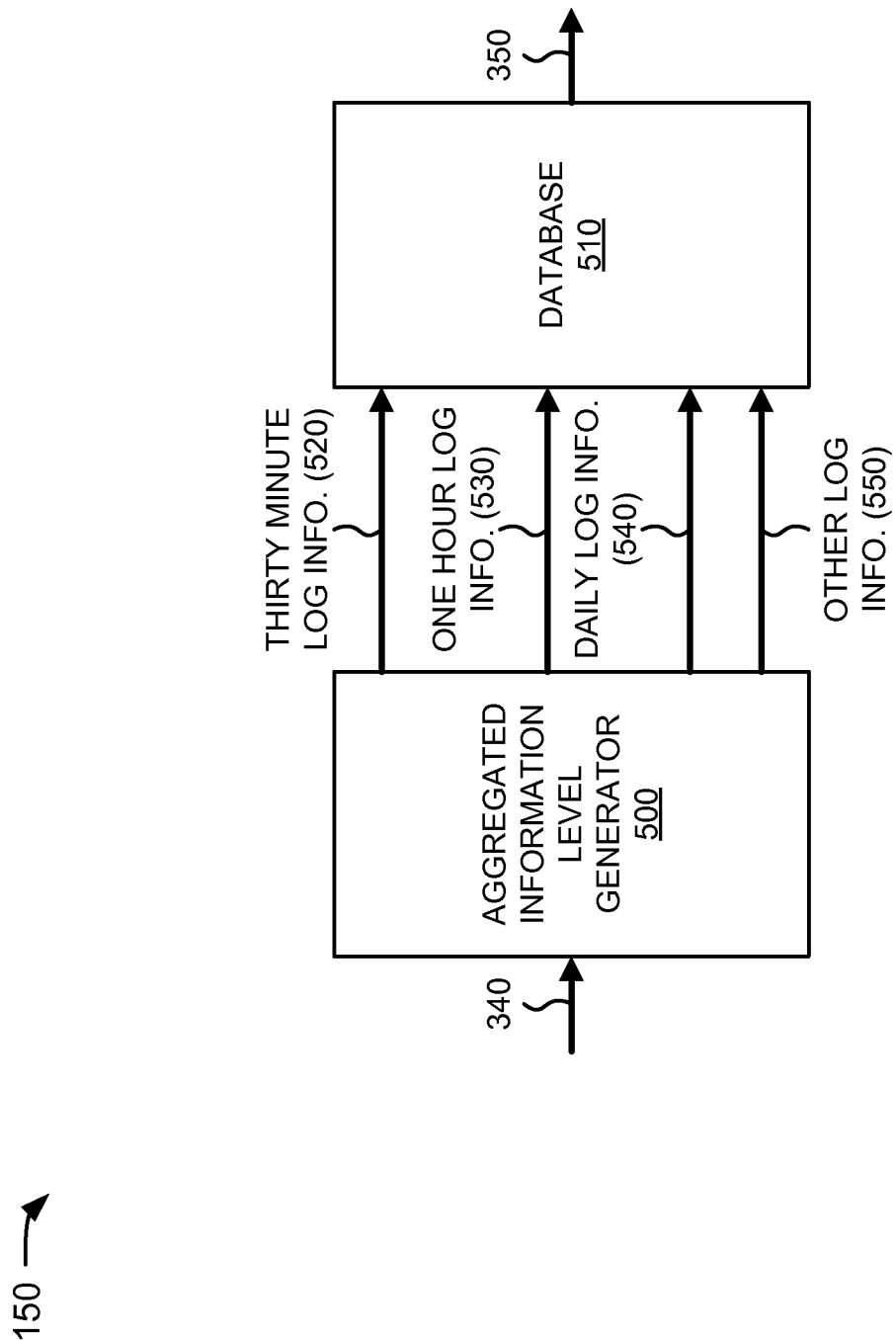
FIG. 5 depicts a diagram of exemplary functional components of the database server illustrated in FIG. 1.

FIG. 5 depicts a diagram of exemplary functional components of database server 150. In one implementation, the functions described in connection with FIG. 5 may be performed by one or more components of device 200 (FIG. 2). As shown in FIG. 5, database server 150 may include an aggregated information level generator 500 and a database 510.

Aggregated information level generator 500 may include hardware or a combination of hardware and software that may receive aggregated log information 340 from aggregation server 140, and may generate different levels of aggregated log information 340 based on time (e.g., one hour log information, daily log information, etc.) and/or type (e.g., log information associated with backlog, failures, etc.). For example, as shown in FIG. 5, aggregated information level generator 500 may generate thirty minute log information 520, one hour log information 530, daily log information 540, and/or other log information 550 based on aggregated log information 340 (e.g., and using data from five minute intervals). Thirty minute log information 520 may include aggregated log information 340 over a thirty minute time period. One hour log information 530 may include aggregated log information 340 over a one hour time period. Daily log information 540 may include aggregated log information 340 over a twenty-four hour time period. Other log information 550 may include one or more portions of aggregated log information 340 associated with backlog, failures, etc. of VM server 120. Aggregated information level generator 500 may provide thirty minute log information 520, one hour log information 530, daily log information 540, and/or other log information 550 to database 510 for storage.

Database 510 may include one or more storage devices that may store information received by and/or provided to database server 150. In one implementation, database 510 may store thirty minute log information 520, one hour log information 530, daily log information 540, and/or other log information 550. In one example, database 510 may provide thirty minute log information 520, one hour log information 530, daily log information 540, and/or other log information 550 to reporting device 160. In another example, database 510 may provide selected aggregated log information 350 (e.g., one or more of the different levels of aggregated log information 340 that may be selected by a user of reporting device 160) to reporting device 160.

Although FIG. 5 shows exemplary functional components of database server 150, in other implementations, database server 150 may contain fewer, different, differently arranged, or additional functional components than depicted in FIG. 5. In still other implementations, one or more functional components of database server 150 may perform one or more other tasks described as being performed by one or more other functional components of database server 150.

Figure 6:
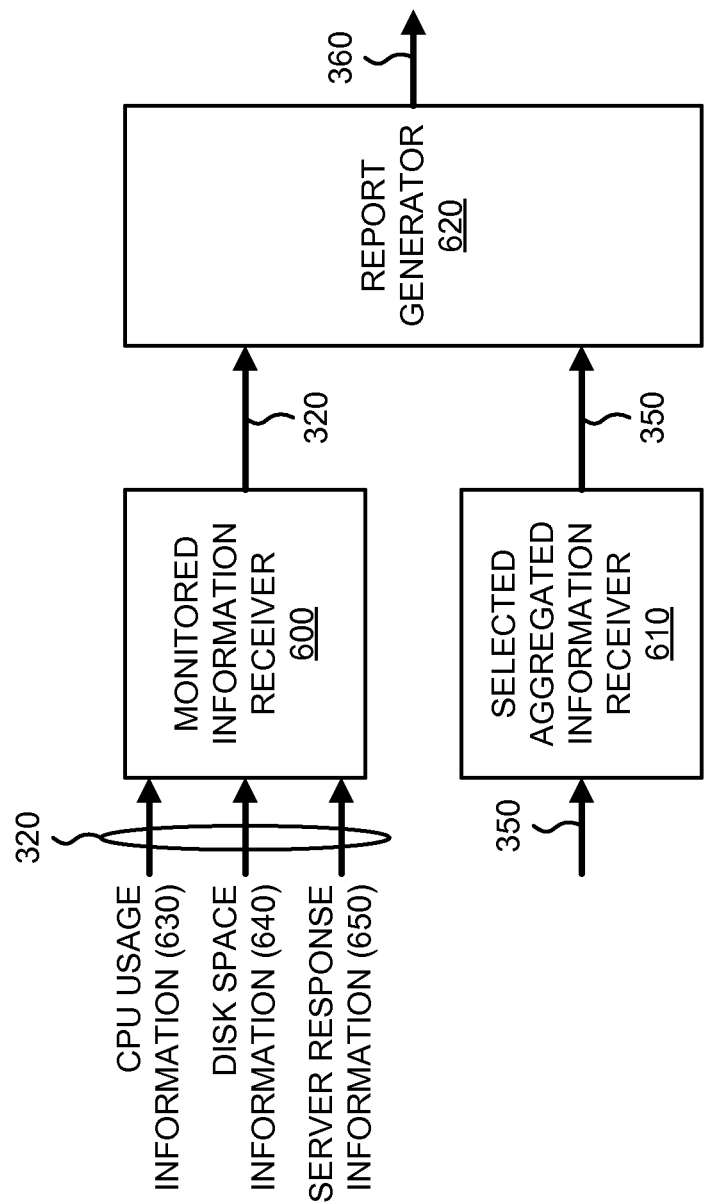
FIG. 6 illustrates a diagram of exemplary functional components of the reporting device depicted in FIG. 1.

FIG. 6 illustrates a diagram of exemplary functional components of reporting device 160. In one implementation, the functions described in connection with FIG. 6 may be performed by one or more components of device 200 (FIG. 2). As shown in FIG. 6, reporting device 160 may include a monitored information receiver 600, a selected aggregated information receiver 610, and a report generator 620.

Monitored information receiver 600 may include hardware or a combination of hardware and software that may receive monitored information 320 from VM server 120. Monitored information 320 may include, for example, CPU usage information 630, disk space information 640, and/or server response information 650. CPU usage information 630 may include processor (e.g., CPU) usage by one or more processors associated with VM server 120. Disk space information 640 may include memory (e.g., disk space) usage by one or more memory devices associated with VM server 120. Server response information 650 may include information associated with whether VM server 120 is responding. As further shown in FIG. 6, monitored information receiver 600 may provide monitored information 320 to report generator 620.

Selected aggregated information receiver 610 may include hardware or a combination of hardware and software that may retrieve selected aggregated log information 350 from database server 150. Alternatively and/or additionally, selected aggregated information receiver 610 may receive the different levels of aggregated log information 340 from database server 150. Selected aggregated information receiver 610 may provide selected aggregated log information 350 (and/or the different levels of aggregated log information 340) to report generator 620.

Report generator 620 may include hardware or a combination of hardware and software that may receive monitored information 320 from monitored information receiver 600, and may receive selected aggregated log information 350 from selected aggregated information receiver 610. Report generator 620 may generate real time report information 360 based on the received information (e.g., based on monitored information 320, the different levels of aggregated log information 340, and/or selected aggregated log information 350). Real time report information 360 may include one or more reports associated with operation of VM server 120. Report generator 620 may provide the one or more reports (e.g., in real time) for display to a user of reporting device 160, and/or may provide the one or more reports to another device for storage and later retrieval. Alternatively and/or additionally, report generator 620 may store real time report information 360 for later retrieval by the user of reporting device 160.

Although FIG. 6 shows exemplary functional components of reporting device 160, in other implementations, reporting device 160 may contain fewer, different, differently arranged, or additional functional components than depicted in FIG. 6. In still other implementations, one or more functional components of reporting device 160 may perform one or more other tasks described as being performed by one or more other functional components of reporting device 160.

FIGS. 7 and 8 depict flow charts of an exemplary process 700 for aggregating log information associated with VM transactions according to implementations described herein. In one implementation, process 700 may be performed by aggregation server 140. In another implementation, some or all of process 700 may be performed by another device or group of devices, including or excluding aggregation server 140.

As illustrated in FIG. 7, process 700 may include receiving, from one or more voicemail servers, log information associated with voicemail transactions (block 710), and determining data elements of the log information to be aggregated (block 720). For example, in implementations described above in connection with FIG. 4, log information determiner 400 of aggregation server 140 may receive log information 330 from VM server 120, and may receive (e.g., from reporting device 160) data elements to aggregate 430. Data elements to aggregate 430 may define particular data elements (e.g., of log information 330) to be aggregated. The particular data elements to aggregate may be changed (e.g., data elements may be added or subtracted) by the user of reporting device 160. In one example, log information determiner 400 may select (e.g., from log information 330 and based on data elements to aggregate 430) VM transaction response times 440, failure messages 450 associated with VM server 120, and/or backlog messages 460 associated with VM server 120 as information to be aggregated.

As further shown in FIG. 7, the determined data elements of the log information may be aggregated (block 730), a time period to provide the aggregated log information to a database may be determined (block 740), and the aggregated log information may be provided to the database at the determined time period (block 750). For example, in implementations described above in connection with FIG. 4, log time determiner 410 of aggregation server 140 may provide log time 470 to data aggregator 420 of aggregation server 140. Log time 470 may include a predetermined time interval when aggregation server 140 may provide aggregated log information 340 to database server 150. Data aggregator 420 may receive VM transaction response times 440, failure messages 450, and backlog messages 460 from log information determiner 400, and may receive log time 470 from log time determiner 410. Data aggregator 420 may aggregate VM transaction response times 440, failure messages 450, and backlog messages 460 to produce aggregated log information 340. Data aggregator 420 may provide aggregated log information 340 to database server 150 at the predetermined time interval provided by log time 470.

Process block 720 may include the process blocks illustrated in FIG. 8. As shown in FIG. 8, process block 720 may include selecting a response time of each voicemail transaction as a data element to be aggregated (block 800), selecting failure messages associated with the one or more voicemail servers as a data element to be aggregated (block 810), and selecting backlog messages associated with the one or more voicemail servers as a data element to be aggregated (block 820). For example, in implementations described above in connection with FIG. 4, log information determiner 400 of aggregation server 140 may receive log information 330 from VM server 120, and may receive (e.g., from reporting device 160) data elements to aggregate 430. Data elements to aggregate 430 may define particular data elements of log information 330 to be aggregated. In one example, log information determiner 400 may select (e.g., from log information 330 and based on data elements to aggregate 430) VM transaction response times 440, failure messages 450, and/or backlog messages 460 as information to be aggregated. VM transaction response times 440 may include response times for voicemail transactions (e.g., voicemail messages, a number of voicemails, a number of unheard voicemails, a list of IDs, etc.). Failure messages 450 may include messages indicating failure by VM server 120. Backlog messages 460 may include messages indicating backlog associated with VM server 120.

FIG. 9 illustrates a flow chart of an exemplary process 900 for providing different levels of aggregated log information to the reporting device according to implementations described herein. In one implementation, process 900 may be performed by database server 150. In another implementation, some or all of process 900 may be performed by another device or group of devices, including or excluding database server 150.

As illustrated in FIG. 9, process 900 may include receiving, from an aggregation server, aggregated log information associated with one or more voicemail transactions (block 910), and generating different levels of aggregated log information based on a time and/or type associated with the aggregated log information (block 920). For example, in implementations described above in connection with FIG. 5, aggregated information level generator 500 of database server 150 may receive aggregated log information 340 from aggregation server 140, and may generate different levels of aggregated log information 340 based on time (e.g., one hour log information, daily log information, etc.) and/or type (e.g., log information associated with backlog, failures, etc.). In one example, aggregated information level generator 500 may generate thirty minute log information 520, one hour log information 530, daily log information 540, and/or other log information 550 based on aggregated log information 340 (e.g., and using data from five minute intervals).

As further shown in FIG. 9, the different levels of aggregated log information may be provided to a reporting device for reporting with monitored information associated with the one or more voicemail servers (block 930). For example, in implementations described above in connection with FIG. 5, database 510 of database server 150 may store thirty minute log information 520, one hour log information 530, daily log information 540, and/or other log information 550. In one example, database 510 may provide thirty minute log information 520, one hour log information 530, daily log information 540, and/or other log information 550 to reporting device 160. In another example, database 510 may provide selected aggregated log information 350 (e.g., one or more of the different levels of aggregated log information 340 that may be selected by a user of reporting device 160) to reporting device 160.

FIG. 10 depicts a flow chart of an exemplary process 1000 for generating reports associated with VM server(s) according to implementations described herein. In one implementation, process 1000 may be performed by reporting device 160. In another implementation, some or all of process 1000 may be performed by another device or group of devices, including or excluding reporting device 160.

As illustrated in FIG. 10, process 1000 may include receiving, from one or more voicemail servers, CPU usage, disk space usage, and/or response information associated with the one or more voicemail servers (block 1010), and receiving, from a database server, different levels of aggregated log information associated with voicemail transactions performed by the one or more voicemail servers (block 1020). For example, in implementations described above in connection with FIG. 6, monitored information receiver 600 of reporting device 160 may receive monitored information 320 (e.g., CPU usage information 630, disk space information 640, and/or server response information 650) from VM server 120. CPU usage information 630 may include processor (e.g., CPU) usage by one or more processors associated with VM server 120. Disk space information 640 may include memory (e.g., disk space) usage by one or more memories associated with VM server 120. Server response information 650 may include information associated with whether VM server 120 is responding. Selected aggregated information receiver 610 of reporting device 160 may retrieve selected aggregated log information 350 from database server 150 and/or may receive the different levels of aggregated log information 340 from database server 150.

As further shown in FIG. 10, process 1000 may include generating a report associated with the one or more voicemail servers based on the received information (block 1030), and providing the report, in real time, for display to a user and/or to a device for storage and later retrieval (block 1040). For example, in implementations described above in connection with FIG. 6, report generator 620 of reporting device 160 may receive monitored information 320 from monitored information receiver 600, and may receive selected aggregated log information 350 from selected aggregated information receiver 610. Report generator 620 may generate real time report information 360 based on the received information (e.g., based on monitored information 320, the different levels of aggregated log information 340, and/or selected aggregated log information 350). Real time report information 360 may include one or more reports associated with operation of VM server 120. Report generator 620 may provide the one or more reports (e.g., in real time) for display to a user of reporting device 160, and/or may provide the one or more reports to another device for storage and later retrieval.

Implementations described herein may provide systems and/or methods that may aggregate log information associated with voicemail (VM) servers, and may provide different levels (e.g., based on time periods or intervals) of aggregated data for reporting purposes. In one implementation, for example, the systems and/or methods may receive, from one or more voicemail servers, log information associated with voicemail transactions. The systems and/or methods may determine data elements of the log information to be aggregated, and may aggregate the determined data elements of the log information. The systems and/or methods may determine a time period to provide the aggregated log information to a database, and may provide the aggregated log information to the database at the determined time period.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-10, the order of the blocks may be modified in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
  receiving, by one or more devices, log information associated with voicemail transactions performed by a voicemail server that provides information associated with voicemails to one or more user devices that are permitted to access the voicemails;

determining, by the one or more devices, data elements, of the log information, to be aggregated,
the data elements including response times associated with responses by the voicemail server to requests received from the one or more user devices;

aggregating, by the one or more devices, the data elements of the log information to produce aggregated log information;

determining, by the one or more devices, a time period to use to provide the aggregated log information to a storage device;

providing, by the one or more devices and based on the time period, the aggregated log information to the storage device;

determining, by the one or more devices, usage information that indicates usage of one or more processors of the voicemail server; and providing, by the one or more devices, a report based on the aggregated log information and the usage information that indicates the usage of the one or more processors of the voicemail server.

2. The method of claim 1, where the data elements further include one or more of:
failure messages associated with the voicemail server, or
backlog messages associated with the voicemail server.

3. The method of claim 1, where providing the report comprises:
generating different levels of the aggregated log information based on different periods of time or types of the data elements, and
providing the report based on the different levels of the aggregated log information and the usage information that indicates the usage of the one or more processors of the voicemail server.

4. The method of claim 3,
where the different periods of time include one or more of a particular quantity of minutes, a particular quantity of hours, or a particular quantity of days,
where generating the different levels of the aggregated log information comprises one or more of:
generating first log information for the particular quantity of minutes;
generating second log information for the particular quantity of hours; or
generating third log information for the particular quantity of days, and
where the different levels of the aggregated log information include two or more of the first log information, the second log information, or the third log information.

5. The method of claim 1, further comprising:
receiving monitored information that includes the usage information that indicates the usage of the one or more processors of the voicemail server,
providing the report comprising:
generating the report based on the aggregated log information and the monitored information; and
providing the report for display to a user.

6. The method of claim 1, where providing the report comprises one or more of:
storing the report; or
providing the report to another device for storage.

7. The method of claim 1, where the log information comprises information obtained from log files produced by the voicemail server.

8. A method comprising:
receiving, by one or more devices, aggregated log information associated with voicemail transactions performed by a voicemail server,
the voicemail server providing information associated with voicemails to one or more user devices that are permitted to access the voicemails, and
the aggregated log information including response times associated with responses by the voicemail server to requests received from the one or more user devices;
determining, by the one or more devices, usage information that indicates usage of one or more processors of the voicemail server; and
providing, by the one or more devices, a report based on the response times and the usage information that indicates the usage of the one or more processors of the voicemail server.

9. The method of claim 8, further comprising:
determining different levels of the aggregated log information based on different periods of time,
the different periods of time including one or more of a particular quantity of minutes, a particular quantity of hours, or a particular quantity of days,
determining the different levels of the aggregated log information comprising one or more of:
determining first log information for the particular quantity of minutes;
determining second log information for the particular quantity of hours; or
determining third log information for the particular quantity of days,
the different levels of the aggregated log information include two or more of the first log information, the second log information, or the third log information, and
the report being further based on the different levels of the aggregated log information.

10. A system comprising:
one or more processors to:
receive log information associated with voicemail transactions performed by a voicemail server,
the voicemail server providing information associated with voicemails to one or more user devices that are permitted to access the voicemails;
determine data elements, of the log information, to be aggregated,
the data elements including response times associated with responses by the voicemail server to requests received from the one or more user devices,
aggregate the data elements of the log information to produce aggregated log information,
determine a time period to use to provide the aggregated log information to a storage device,
provide, based on the time period, the aggregated log information to the storage device,
determine usage information that indicates usage of at least one processor of the voicemail server, and
provide a report based on the aggregated log information and the usage information that indicates the usage of the at least one processor of the voicemail server.

11. The system of claim 10, where the data elements further include one or more of:
failure messages associated with the voicemail server, or
backlog messages associated with the voicemail server.

12. The system of claim 10,
where, when providing the report, the one or more processors are further to:

determine different levels of the aggregated log information based on different periods of time or different types of the data elements, and
provide the report based on the different levels of the aggregated log information and the usage information that indicates the usage of the one or more processors of the voicemail server, and
where the different levels of the aggregated log information include two or more of:
first log information for a particular quantity of minutes,
second log information for a particular quantity of hours, or
third log information for a particular quantity of days.

13. The system of claim 10, where, when providing the report, the one or more processors are to:
generate the report based on the aggregated log information and based on monitored information that includes the usage information that indicates the usage of the one or more processors of the voicemail server, and
provide the report for display to a user.

14. The system of claim 13, where the monitored information further includes response information associated with whether the voicemail server is responding.

15. The system of claim 13, where, when providing the report, the one or more processors are to:
provide the report to another device for storage.

16. The system of claim 10, where the log information comprises information obtained from log files produced by the voicemail server.

17. The system of claim 10, where the one or more processors are further to:
determine different levels of the aggregated log information based on different periods of time or different types of the data elements,
receive a request for a particular level of the different levels of the aggregated log information, and
transmit, based on the request, the particular level.

18. A non-transitory computer-readable medium storing instructions, the instructions comprising:
one or more instructions that, when executed by one or more processors, cause the one or more processors to:
receive, from a voicemail server, log information associated with voicemail transactions performed by the voicemail server that provides information associated with voicemails to one or more user devices that are permitted to access the voicemails,
determine data elements, of the log information, to be aggregated,
aggregate the data elements of the log information to produce aggregated log information,
determine a time period to use to provide the aggregated log information to a storage device,
provide, based on the time period, the aggregated log information to the storage device,
the aggregated log information including response times associated with responses by the voicemail server to requests received from the one or more user devices,
receive monitored information associated with the voicemail server,
the monitored information including usage information that indicates usage of at least one processor of the voicemail server,
generate a report based on the monitored information and the aggregated log information, and
provide the report for display to a user.

19. The non-transitory computer-readable medium of claim 18, where the monitored information further includes response information associated with whether the voicemail server is responding.

20. The non-transitory computer-readable medium of claim 18, where the data elements further include one or more of:
failure messages associated with the voicemail server, or
backlog messages associated with the voicemail server.

21. The non-transitory computer-readable medium of claim 18, where the one or more instructions to generate the report include:
one or more instructions that, when executed by the one or more processors, cause the one or more processors to:
determine different levels of the aggregated log information based on different periods of time or different types, and
determine the report based on the monitored information and the different levels of the aggregated log information, and
where the different levels of the aggregated log information include one or more of:
first log information for a particular quantity of minutes,
second log information for a particular quantity of hours, or
third log information for a particular quantity of days.

22. The method of claim 1, where the log information includes information associated with one or more of:
a quantity of the voicemails that have not been accessed by the one or more user devices, or
information associated with a backlog of the voicemail server.

23. The method of claim 1,
where receiving the log information includes:
receiving the log information from the voicemail server, and
where the voicemail server retrieves the information associated with the voicemails from one or more voicemail systems that store the voicemails.

24. The method of claim 8, where the aggregated log information further includes information associated with one or more of:
a quantity of the voicemails that have not been accessed by the one or more user devices, or
a quantity of failures, by the voicemail server, to respond to requests received from the one or more user devices.

25. The method of claim 8, further comprising:
selecting the response times for the voicemail transactions as a first data element to be aggregated;
selecting failure messages associated with the voicemail transactions as a second data element to be aggregated; and
providing the aggregated log information based on selecting the response times and based on selecting the failure messages.

* * * * *